(12) United States Patent
Larbig et al.

(10) Patent No.: US 11,796,005 B2
(45) Date of Patent: Oct. 24, 2023

(54) BEARING ARRANGEMENT FOR A MACHINE ELEMENT

(71) Applicant: ZF FRIEDRICHSHAFEN AG, Friedrichshafen (DE)

(72) Inventors: Julian Larbig, Ringgau (DE); Steffen Matschas, Bad Bocklet (DE); Spyros Kotsalos, Haßfurt (DE); Axel Rohm, Schonungen (DE); Martin Pfeuffer, Schweinfurt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/793,092

(22) PCT Filed: Jan. 14, 2021

(86) PCT No.: PCT/EP2021/050639
§ 371 (c)(1),
(2) Date: Jul. 15, 2022

(87) PCT Pub. No.: WO2021/144336
PCT Pub. Date: Jul. 22, 2021

(65) Prior Publication Data
US 2023/0213067 A1 Jul. 6, 2023

(30) Foreign Application Priority Data
Jan. 17, 2020 (DE) .................... 10 2020 200 536.2

(51) Int. Cl.
*F16C 19/06* (2006.01)
*F16C 35/067* (2006.01)
(Continued)

(52) U.S. Cl.
CPC ............ *F16C 35/067* (2013.01); *F16C 19/06* (2013.01); *F16C 35/077* (2013.01);
(Continued)

(58) Field of Classification Search
CPC ...... F16C 19/06; F16C 33/586; F16C 35/067; F16C 35/077; F16C 2226/60;
(Continued)

(56) References Cited

U.S. PATENT DOCUMENTS 2,891,829 A * 6/1959 Irvin .................... H02K 5/1732
292/256.73
3,506,317 A * 4/1970 De Angeli ............ F16C 35/067
384/542
(Continued)

FOREIGN PATENT DOCUMENTS

| DE | 1961014 | 8/1970 |
|----|---------|--------|
| DE | 7403591 | 8/1975 |

(Continued)

OTHER PUBLICATIONS

DE10201726999_DESCRIPTION.*
(Continued)

*Primary Examiner* — Phillip A Johnson
(74) *Attorney, Agent, or Firm* — Cozen O'Connor

(57) ABSTRACT

Bearing arrangement for a machine element having a bearing having an outer bearing race radially fixed by a cylindrical cutout in the mounted state of the bearing arrangement; a locking element having an annular radial portion and at least one axial portion; and the annular radial portion of the locking element cooperates with a region of the outer bearing race on a first axial side of the outer bearing race to secure the outer bearing race at the first axial side; and at least one securing element which, in a mounted state of the bearing arrangement, is in operative engagement with the at least one axial portion of the locking element and with the machine element such that the locking element secures the outer bearing race at the first axial side.

12 Claims, 10 Drawing Sheets

(51) Int. Cl.
 *F16C 35/077* (2006.01)
 *F16D 23/14* (2006.01)

(52) U.S. Cl.
 CPC ...... *F16C 2226/60* (2013.01); *F16C 2226/72* (2013.01); *F16C 2226/74* (2013.01); *F16C 2226/76* (2013.01); *F16C 2361/43* (2013.01); *F16D 23/14* (2013.01)

(58) Field of Classification Search
 CPC .............. F16C 2226/72; F16C 2226/74; F16C 2226/76; F16C 2361/43; F16D 23/14; F16D 2021/0615
 See application file for complete search history.

(56) References Cited

U.S. PATENT DOCUMENTS

| | | | | |
|---|---|---|---|---|
| 4,124,257 | A * | 11/1978 | Derner | F16C 23/084 384/205 |
| 4,386,812 | A * | 6/1983 | Anderson | H02K 5/1732 384/542 |
| 4,946,420 | A * | 8/1990 | Jackel | F16C 35/077 192/208 |
| 7,303,495 | B2 * | 12/2007 | Schoenek | F16C 35/067 74/606 R |
| 2017/0268573 | A1 * | 9/2017 | Yang | F16C 19/16 |
| 2019/0048944 | A1 * | 2/2019 | Geiser | F16C 33/586 |

FOREIGN PATENT DOCUMENTS

| | | | | |
|---|---|---|---|---|
| DE | 2519023 | A * | 11/1976 | ............ F16C 35/067 |
| DE | 29704250 | | 4/1997 | |
| DE | 102005019188 | | 12/2005 | |
| DE | 102004054457 | B3 * | 2/2006 | ............ F16C 35/067 |
| DE | 102010003722 | | 10/2011 | |
| DE | 2016124837 | | 4/2018 | |
| DE | 102017116608 | A1 * | 1/2019 | |
| DE | 102017126999 | | 5/2019 | |
| EP | 2009302 | | 12/2008 | |
| EP | 3056750 | | 8/2016 | |
| FR | 2573826 | A1 * | 5/1986 | |
| WO | WO 2015182617 | | 12/2015 | |
| WO | WO 2019032246 | | 2/2019 | |

OTHER PUBLICATIONS

DE102004054457_DESCRIPTION.*
Office Action of corresponding German Patent Application No. 10 2020 200 536.2.

* cited by examiner

BEARING ARRANGEMENT FOR A MACHINE ELEMENT

CROSS REFERENCE TO RELATED APPLICATIONS

This is a U.S. national stage of Application No. PCT/EP2021/050639 filed Jan. 14, 2021. Priority is claimed on German Application No. DE 10 2020 200 536.2 filed Jan. 17, 2020 the content of which is incorporated herein by reference.

BACKGROUND OF THE INVENTION

1. Field of the Invention

The disclosure is directed to a bearing arrangement for a machine element having a locking element and a securing means and to a use of the bearing arrangement for mounting an input shaft on an output hub.

2. Description of Related Art

Bearing arrangements are used in very diverse fields of application in which an outer race of the bearing is to be secured radially and axially and the device for axially securing the bearing during mounting or removal are not freely accessible from the mounting side. One example is a clutch device for a motor vehicle that makes it possible to bring about a torque-transferring connection between the output of a combustion engine or electric machine and a transmission downstream thereof.

SUMMARY OF THE INVENTION

Therefore, the problem presenting itself is to suggest an improved bearing arrangement which, in particular, requires less installation space and is, at the same time, inexpensive to produce and which makes it possible to mount and remove the bearing arrangement without at least some of the means for axially securing the bearing being freely accessible.

Corresponding to one aspect, for at least partially solving the problems described above, a bearing arrangement for a machine element having a locking element and a securing element and a use of the bearing arrangement for mounting an input shaft on an output hub are suggested.

According to an aspect, a bearing arrangement for a machine element is suggested, this bearing arrangement having a bearing with an outer bearing race that is radially fixed by a cylindrical cutout of the machine element in the mounted state of the bearing arrangement. The bearing arrangement further has a locking element that has an annular radial portion and at least one axial portion. The annular radial portion of the locking element is arranged and configured to cooperate with a region of the outer bearing race on a first axial side of the outer bearing race in order to secure the outer bearing race at the first axial side. Further, the bearing arrangement has at least one securing element which, in a mounted state of the bearing arrangement, is in operative engagement with the at least one axial portion of the locking element and with the machine element such that the locking element secures the outer bearing race at the first axial side.

A bearing arrangement of this kind can be used, for example, in the powertrain of a motor vehicle.

The bearing comprises the outer race and an inner race with, in each instance, a first axial side and, opposite thereto, a second axial side, and the outer race has an end face at the first axial side and an end face at the second axial side, the end face of the second axial side of the bearing being located opposite the end face of the first axial side on an outer side of the bearing. The outer race and the inner race of the bearing are rotatable relative to one another. Rolling elements can be arranged between the inner race and the outer race to reduce the frictional resistance between the inner race and the outer race. The outer race can further have an at least partially cylindrical contour. The bearing may be embodied in particular as a rolling element bearing, for example, a grooved ball bearing.

The annular radial portion of the locking element has an annular base body. The at least one axial portion can adjoin the annular base body in one piece at an outer edge of the base body, or the at least one axial portion is connected to the annular radial portion so as to be mechanically detachable or undetachable.

The concept of the cooperation of the annular radial portion of the locking element with the first axial side of the outer bearing race is to be understood in a broad sense. It means that the annular radial portion of the locking element and the first axial side of the outer bearing race may cooperate in any form to secure the outer bearing race at the first axial side and therefore to limit a displacement of the machine element in direction of the first axial side of the bearing race.

In this regard, the locking element need not adjoin the entire first axial side of the outer bearing race. On the contrary, it is sufficient that the locking element adjoin a portion of the first axial side in such a way that the outer bearing race is axially fixed in direction of the first side. The outer bearing race can then always still be axially moveable in direction of the second side.

The machine element can be a rotating component part, for example, a part of a transmission. The inner race of the bearing can be connected to a housing part that is fixed with respect to rotation or to a rotating shaft. Alternatively, the machine element can also be a component part that is fixed with respect to rotation, for example, a housing. In this case, the inner race of the bearing is connected to a rotatable shaft.

The cylindrical cutout of the machine element for receiving the bearing corresponds to the dimensioning of the cylindrical contour of the outer race of the bearing so that the bearing is radially fixed in the cylindrical cutout.

Forming a locking element with an annular radial portion and at least one axial portion is advantageous particularly for a bearing arrangement with a necessarily concealed axial securing of at least one side of a bearing, i.e., when there is no direct access from a mounting side to a locking element which secures a first axial side of the bearing. This is because the axial portion may be configured to so cooperate with the machine element which limits access to the axial fixing during mounting and with a locking element which is accessible from the mounting side that an axial side of the bearing is secured with a locking element. An easily mountable and removable bearing arrangement can be realized in this way.

This bearing arrangement results in a simple arrangement that, in particular, requires little installation space for securing the bearing in a direction of the first axial side. Since the locking element in this bearing arrangement can be accessed from the mounting side, it is also possible to inspect the corresponding connection between the securing means and the at least one axial portion of the locking element.

According to an aspect, it is suggested that the outer bearing race is secured at an end face of a second axial side of the outer bearing race by an abutment surface of the machine element in a second axial direction of the outer bearing race. In this way, it can be brought about that the bearing is secured together with the locking element in both axial directions, and securing in a radial direction is carried out by means of the cylindrical cutout of the machine element.

According to an aspect, it is suggested that the at least one axial portion of the locking element is arranged in a radially outer region of the radial portion of the locking element and at least partially axially outwardly extends around the outer bearing race and, in the mounted state of the bearing arrangement, in order to secure the outer bearing race at the axial side by means of the at least one locking element, cooperates through at least one work access opening of the machine element with the securing means which is supported on a side of the machine element opposite the radial portion of the locking element.

In that the at least one axial portion of the locking element is arranged in a radially outer region of the locking element, the at least one axial portion can at least partially axially outwardly extend around the outer bearing race and enable a cooperation with the securing element on a side of the machine element that is accessible during mounting.

In this regard, the machine element can have work access openings through which the securing element can cooperate with the at least one axial portion of the locking element. Work access openings are, for example, bore holes in axial direction in the machine element.

The locking element can have a plurality of axial portions on a circumference of the annular radial portion of the locking element which are uniformly distributed on the circumference and cooperate with a corresponding quantity of securing elements, or a securing element can be configured to cooperate with a plurality of axial portions.

According to an aspect, it is suggested that the locking element adjoins the end face of the axial side of the outer bearing race at least by part of the annular radial portion in order to secure the outer bearing race at the axial side. For securing in this way, it may be sufficient that the locking element adjoins the end face of the axial side of the outer bearing race. For mounting, it can be advantageous to connect the locking element to the end face of the axial side so as to be mechanically detachable or undetachable. A connection of this kind can be carried out by frictional engagement, positive engagement and/or material bonding, for example, as a screw connection, a glue connection, a weld connection or an interference fit. A connection which is secured with respect to mounting is sufficient for mounting in this way. Such a bearing arrangement requires few modifications of the bearing, occupies little space and is easy to mount.

According to an aspect, it is suggested that the outer bearing race has a circumferential shoulder in an end region at the first axial side, and at least part of the annular radial portion of the locking element adjoins an end face of the shoulder in order to secure the outer bearing race on the axial side. The outer bearing race can provide a radial step at its radially outer cylindrical surface in order to form such a shoulder. In order for the locking element to be connected to or to adjoin the outer bearing shell, the locking element can be configured to provide an opening shaped in such a way that the locking element can be arranged on the outer cylindrical surface of the radial step in order to specify a bearing arrangement having no additional installation space in axial direction. In particular, to facilitate mounting of the bearing arrangement, the locking element configured in this way can be connected to the outer bearing shell, for example, at least so as to be secured with respect to mounting. A connection of this kind can be one that is secured with respect to relative rotation or an operative connection or can be formed by pressing, staking, gluing, screwing or by an additional securing ring arranged in an additional groove of the radial step of the outer bearing race.

According to an aspect, it is suggested that the at least one axial portion of the locking element is formed by a tongue arranged at a radially outer edge of the radial portion of the locking element and which has a radially inwardly open groove in an end region. The securing element is a snap ring that engages in the radially inwardly open groove of the tongue on the side of the machine element opposite the radial portion of the locking element.

A tongue of this kind can be formed, for example, in one piece from a continuation of the radial portion of the locking element by cutting out and shaping. The locking element formed in this way can be provided with a plurality of such tongues and slid onto a step of the outer cylindrical surface of the outer bearing race and subsequently staked. A locking element formed in this way does not require any additional installation space in axial direction and can be manufactured in a simple manner at low cost.

The securing groove can be produced at low cost and in a simple manner, for example, by stamping, embossing and/or by cutting machining.

In an advantageous embodiment form, the tongues always engage between two rivets of the rivet connection between a first machine part and the second machine part of the machine element.

In the neutral position, an outer diameter of the snap ring is greater than or identical to an inner diameter of a circle formed by the grooves of a plurality of tongues. Accordingly, the cylindrical cutout of the machine element can be guided over the bearing from the outside, and the machine element can be secured in the direction of the first axial side in that the snap ring is inserted into the grooves of the tongues projecting through the work access openings by compressing the snap ring. In the relaxed state of the snap ring, the snap ring contacts the machine element and fixes the bearing in the direction of the first axial side by means of the locking element. The expenditure on construction for axially fixing the outer race is limited to the snap ring groove in the tongues and the snap ring.

The installation space requirement of the bearing arrangement is particularly small. Further, a bearing arrangement of this kind is inexpensive to produce.

According to an aspect, it is suggested that the at least one tongue extends through the at least one work access opening and the securing element is an adjusted end portion of the at least one tongue, which is supported on the side of the machine element opposite the radial portion of the locking element. An adjusted end portion of this kind can be formed by rolling an end portion of the tongue, by deforming an end portion of the tongue or by bending an end portion of the tongue. The bearing arrangement does not require a snap ring to secure the locking element.

According to an aspect, it is suggested that the at least one axial portion of the locking element is formed by a stay bolt connected to the annular radial portion of the locking element, and the stay bolt has a thread. The securing element is a screw that cooperates with the thread, and the screw or the screw head is supported on the side of the machine element opposite the radial portion of the locking element.

The stay bolt can be connected to the radial portion of the locking element by known joining techniques.

According to an aspect, it is suggested that the stay bolt is formed by a hollow rivet which has a thread and is connected to the locking element. The thread of the hollow rivet can be in particular a female thread. Such a construction of the stay bolt is a variant which is particularly simple to produce.

According to an aspect, it is suggested that the at least one axial portion of the locking element is formed by a screw which is connected to the annular radial portion of the locking element by means of a thread in the locking element. The securing element is the head of the screw and the screw cooperates with the thread and is supported on the side of the machine element opposite the radial portion of the locking element. Since the locking element need only be provided with threads in this case, this bearing arrangement is economically advantageous to produce and, further, can be implemented with standardized parts.

According to an aspect, it is suggested that the at least one axial portion of the locking element is formed by a stay bolt which is connected to the annular radial portion of the locking element, the stay bolt having at least one groove in an end region at its circumference. In the mounted state of the bearing arrangement, the stay bolt extends through the work access opening of the machine element on a side of the machine element opposite the radial portion of the locking element. The securing element is formed annularly and has recesses which are configured to form a bayonet-type operative connection with the at least one groove of the stay bolt. For a plurality of axial portions of the locking element, the securing element has a corresponding quantity of bore holes so that the securing element can be slid over the stay bolt for mounting and, by a rotational movement of the annular securing element, elongated holes openly adjoining the bore holes engage in the grooves of the stay bolts in order to cooperate with the stay bolt corresponding to a bayonet mechanism. This annular securing element having a bayonet mechanism can then be supported at a surface of the machine element on the side opposite the radial portion of the locking element so as to cooperate with the locking element such that the bearing is secured in the first axial direction. The elongated hole can advantageously be narrower than would be necessary for the stay bolts to pass freely and have a widening of the elongated hole on the side opposite the bore hole so that the annular securing element is secured with respect to rotation by the spring effect of the narrow portion of the elongated hole. This bearing arrangement allows for a particularly fast mounting because the annular securing element simultaneously engages with bayonet-type closures in a plurality of axial portions of the locking element and can secure with a rotational movement.

According to an aspect, it is suggested for fastening to the radial portion of the locking element that the stay bolt is guided through bore holes in the radial portion of the locking element and is connected by frictional engagement to the radial portion of the locking element by pressing, is connected to the locking element by positive engagement by a collar and/or is connected by a material bond connection such as welding, gluing or soldering.

According to an aspect, it is suggested that the at least one axial portion of the locking element is formed by a hollow rivet connected to the annular radial portion of the locking element. In the mounted state of the bearing arrangement, the hollow rivet extends through the at least one work access opening of the machine element on a side of the machine element opposite the radial portion of the locking element. The securing element is formed in the manner of a rivet collar of the hollow rivet. Accordingly, the rivet collar is formed on the side of the machine element opposite the radial portion of the locking element so that the rivet collar is supported or secured at this surface of the machine element in that the hollow rivet is seamed at this surface. This bearing arrangement is very inexpensive to produce and can be opened by removing the rivet collar.

According to an aspect, it is suggested that the locking element has a plurality of axial portions on a circumference of the annular radial portion of the locking element which are uniformly distributed on the circumference. This plurality can typically comprise a quantity of three, four, five, six or seven or more axial portions of the locking element.

The use of one of the bearing arrangements for mounting an input shaft on an output hub is suggested. In this regard, the input shaft can be connected to a plate carrier.

BRIEF DESCRIPTION OF THE DRAWINGS

Embodiment examples of the invention are described in more detail in the following referring to the schematic drawings in which like or similar elements are provided with the same reference numerals.

The drawings show.

DETAILED DESCRIPTION OF THE PRESENTLY PREFERRED EMBODIMENTS

Figure 1A:
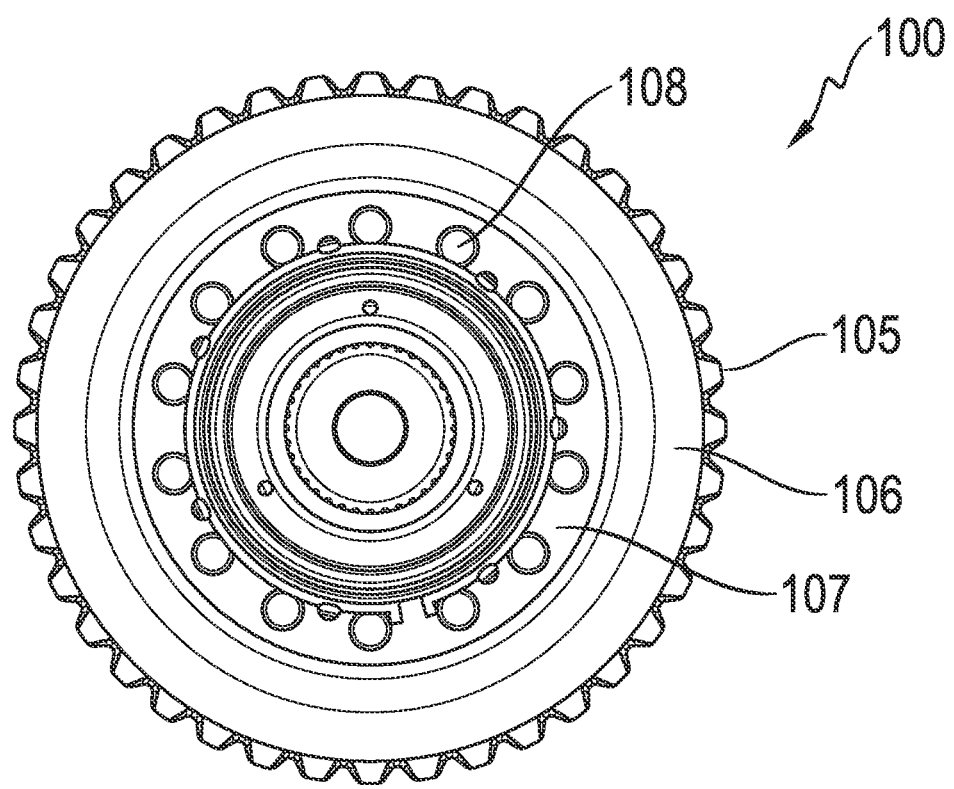
FIG. 1A is a machine element seen from the mounting direction with axial portions of a locking element which are secured by snap ring.
Figure 1B:
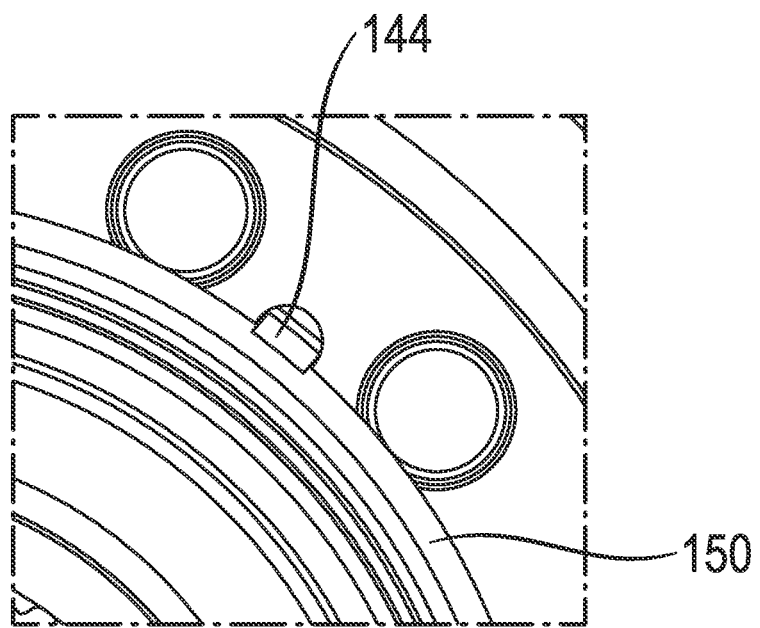
FIG. 1B is a detail from FIG. 1A.
Figure 1C:
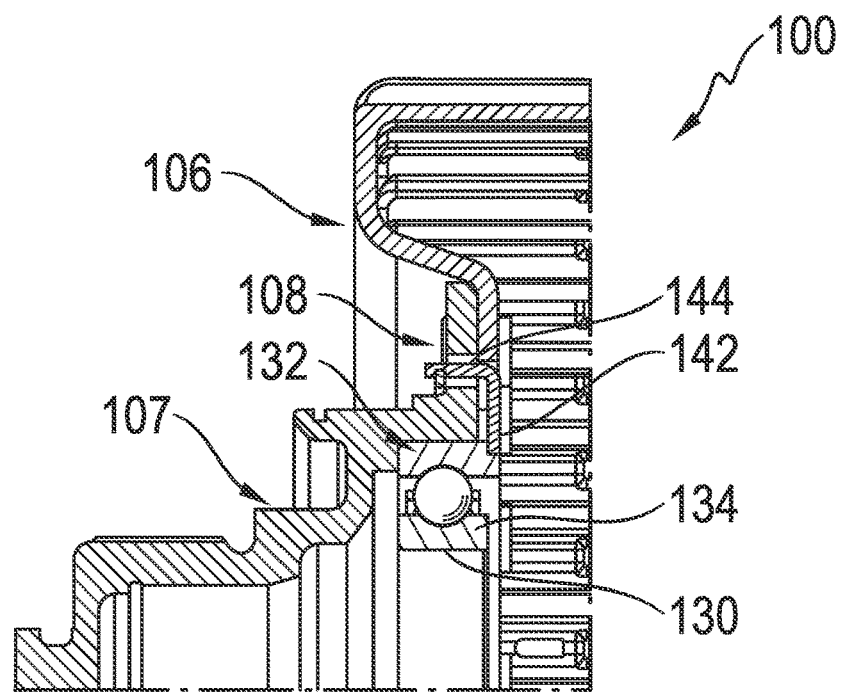
FIG. 1C is a cross section of the bearing arrangement from FIG. 1A.
Figure 1D:
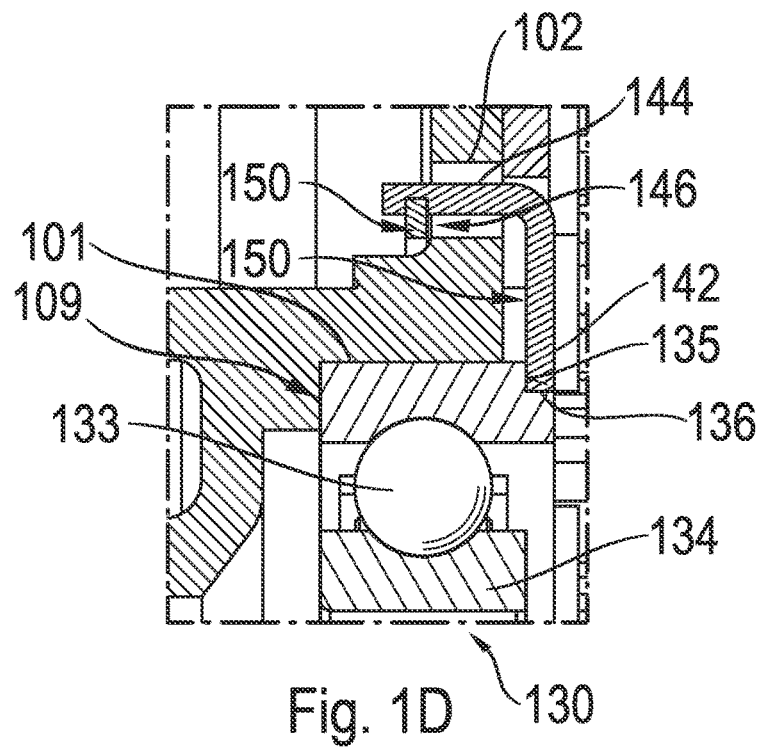
FIG. 1D is a detail from FIG. 1C.
Figure 1E:
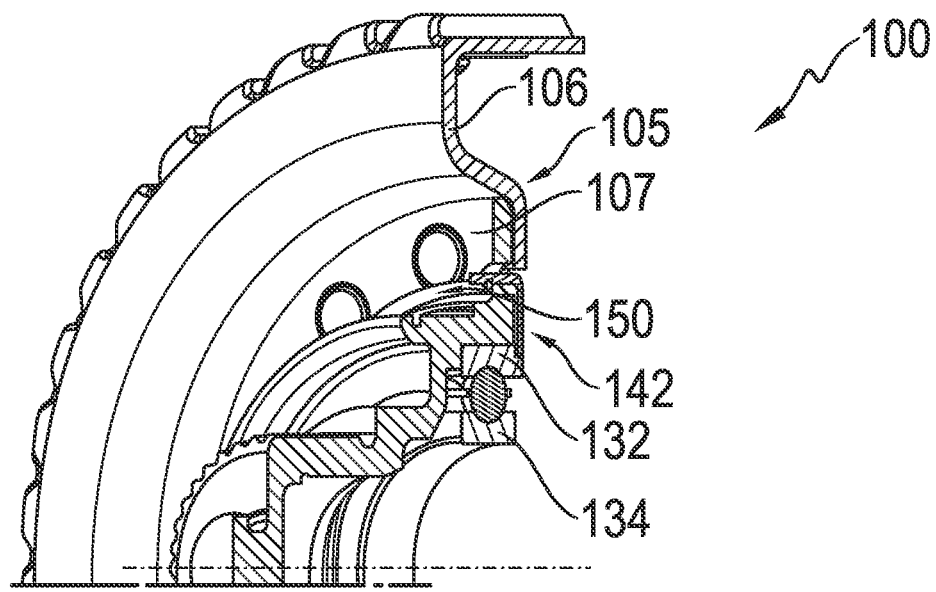
FIG. 1E is an isometric view of the bearing arrangement from FIG. 1C.
Figure 1F:
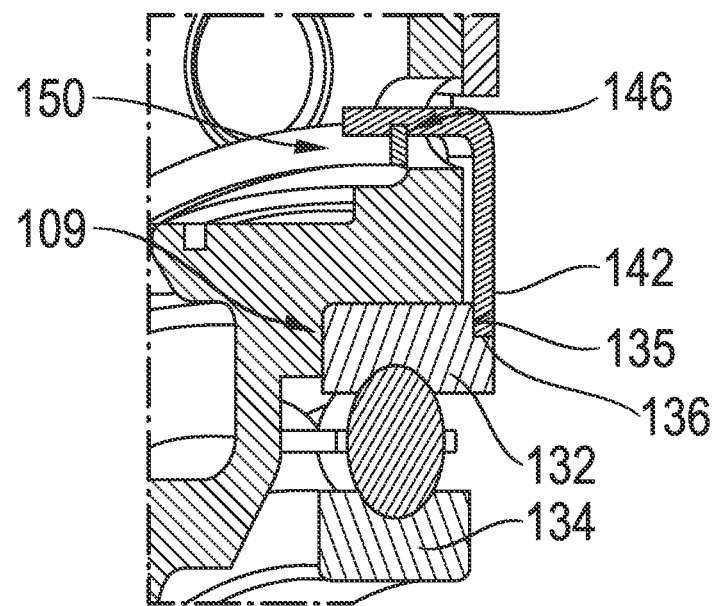
FIG. 1F is a detail from FIG. 1E.
Figure 1G:
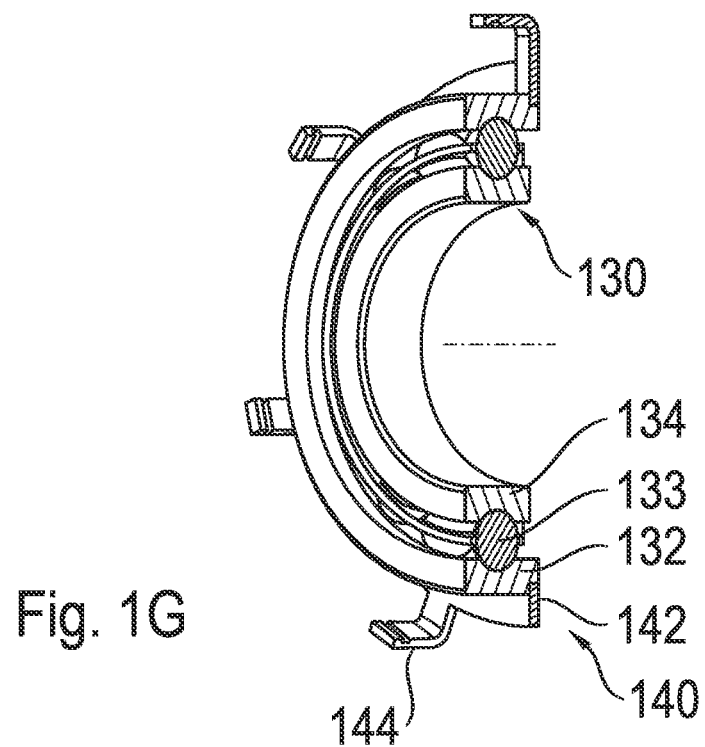
FIG. 1G is an isometric view of a bearing with a locking element according to FIG. 1E.
Figure 1H:
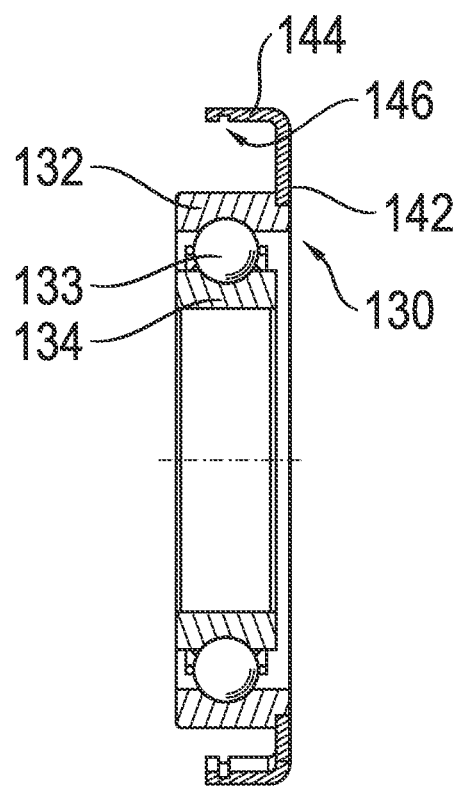
FIG. 1H is a cross section of the bearing from FIG. 1G.
Figure 1I:
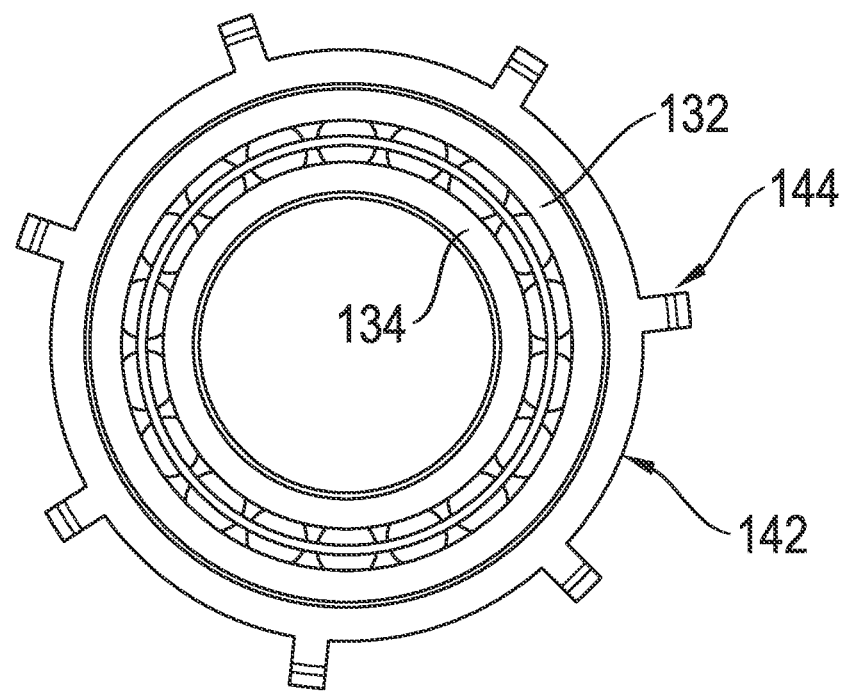
FIG. 1I is a top view of the bearing from FIG. 1G.
Figure 2A:
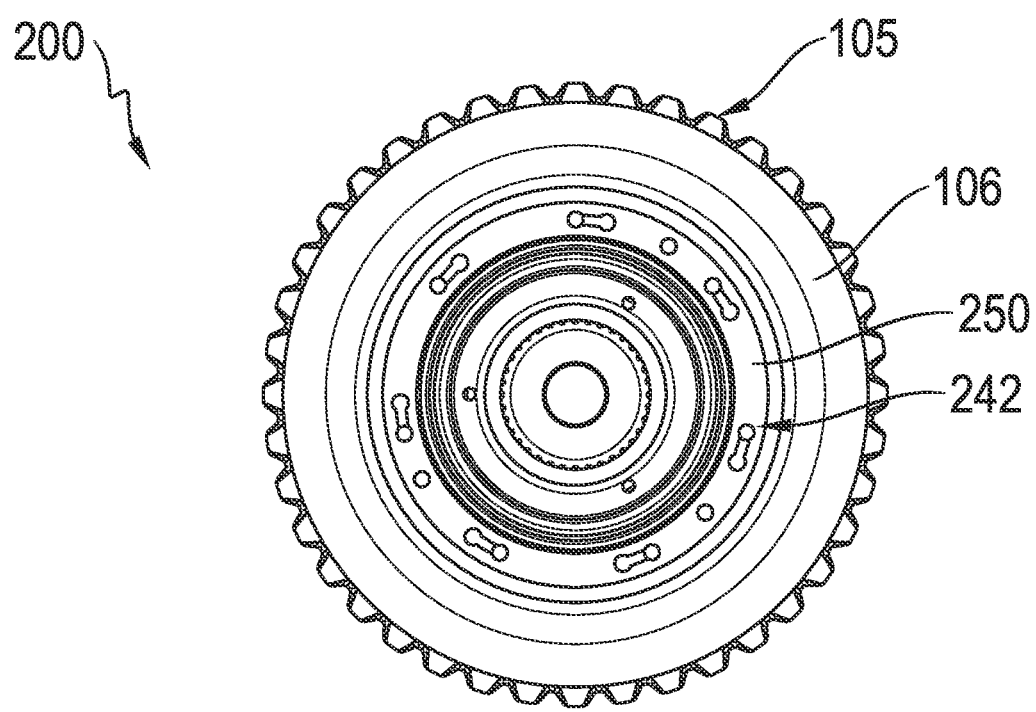
FIG. 2A is a machine element viewed from the mounting direction with an annular securing means for axial portions of a locking element.
Figure 2B:
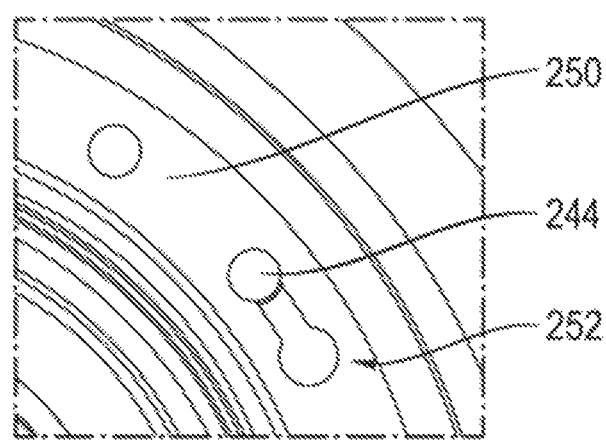
FIG. 2B is a detail from FIG. 2A.
Figure 2C:
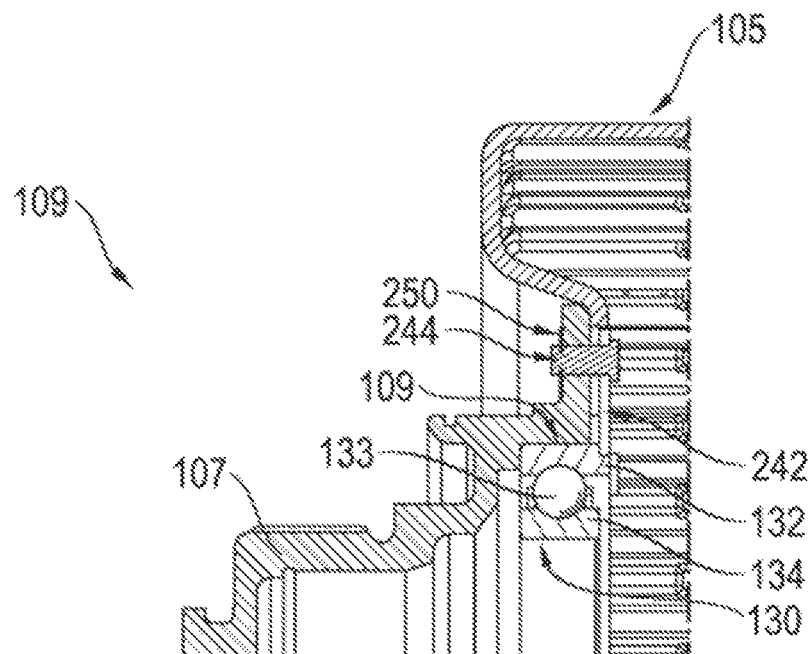
FIG. 2C is a cross section through a mounted bearing arrangement from 2A.
Figure 2D:
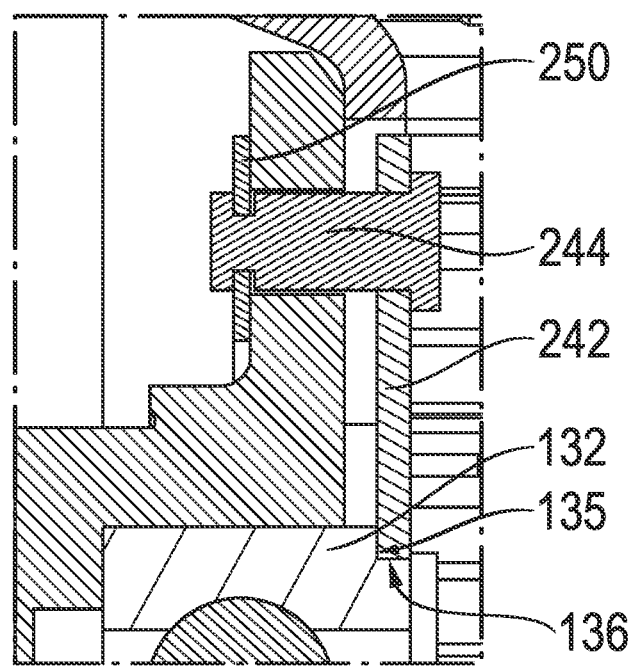
FIG. 2D is a detail from FIG. 2C.
Figure 2E:
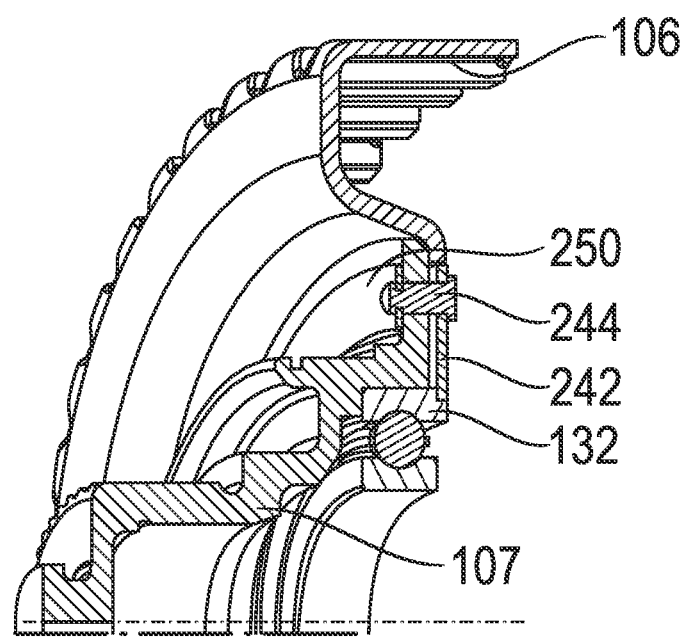
FIG. 2E is an isometric view of the bearing arrangement from FIG. 2A.
Figure 2F:
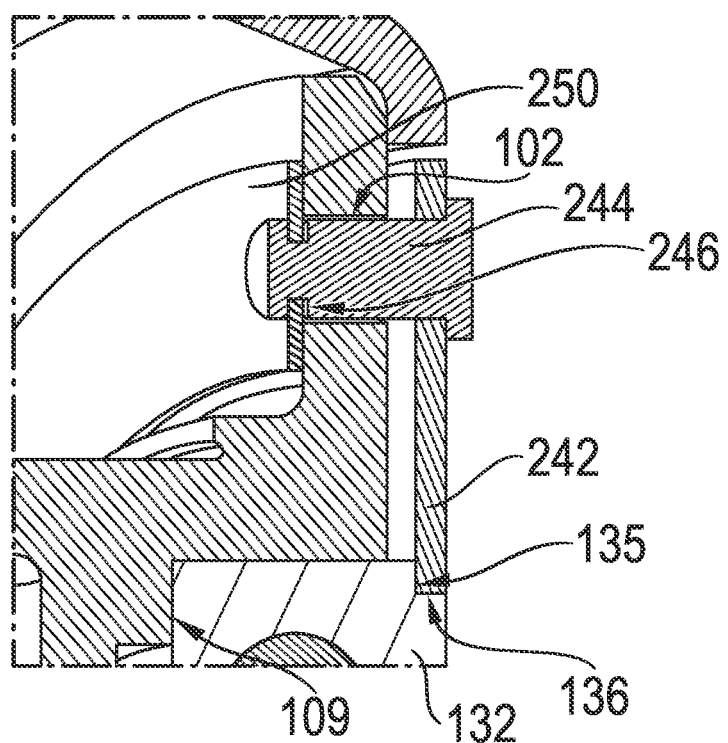
FIG. 2F is a detail from FIG. 2E.
Figure 2G:
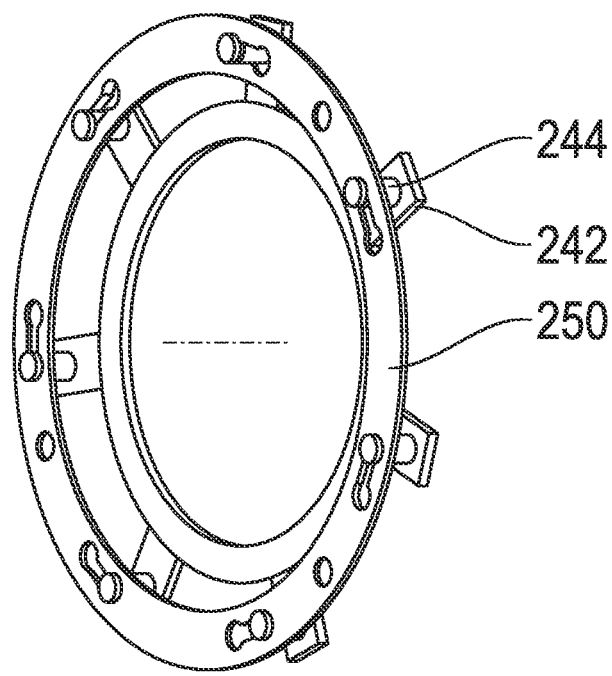
FIG. 2G is an isometric view of a locking element with axial portions and an annular securing element from 2E.
Figure 2H:
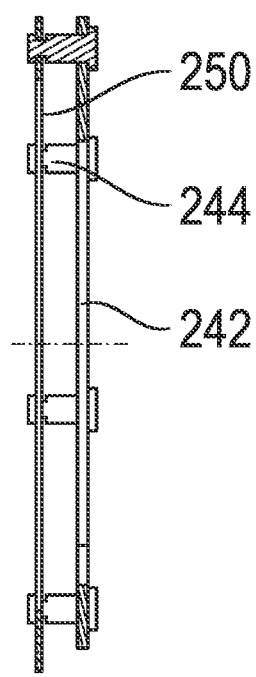
FIG. 2H is a cross section from the arrangement from 2G.
Figure 2I:
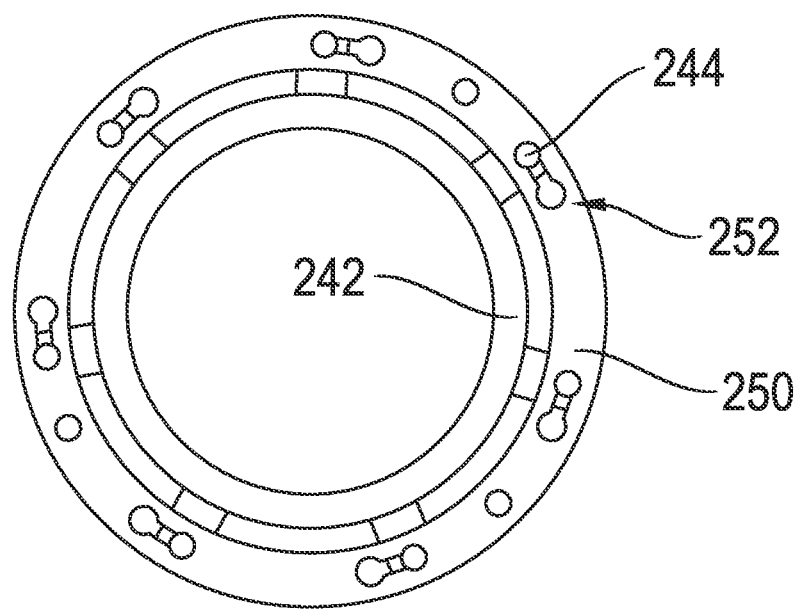
FIG. 2I is a top view from the mounting direction of the arrangement from 2G.

FIGS. 1A to 1I show a mounted bearing arrangement 100 and details of the bearing arrangement 100 in which the axial portions of the locking element are constructed as tongues 144 and have a snap ring 150 as a securing element.

The bearing arrangement 100 for a machine element 105 has a bearing 130 formed as a grooved ball bearing and which has an outer bearing race 132 and rolling elements 133 arranged between the inner bearing race 134 and the outer bearing race 132. The bearing 130 is arranged in a cylindrical cutout 101 of the machine element 105 and is accordingly radially fixed.

The machine element 105 itself can have a first machine part 106 and a second machine part 107. In the present embodiment example, the first machine part 106 can be formed as input shaft and the second machine part 107 can be formed as plate carrier. The first machine part 106 and the second machine part 107 can be connected to one another by rivets 108 or welds.

The annular radial portion 142 of the locking element 140 has an opening arranged on an outer step 136 of the outer bearing race 132 in order to cooperate with an axial end face 135 of a circumferential shoulder of the outer bearing race 132 in an end region in that it adjoins an end face 135 of the shoulder at least by part of the annular radial portion 142 of the locking element 140 in order to secure the outer bearing race 132 at the first axial side.

The locking element 140 has an annular radial portion 142 and a plurality of axial portions formed by tongues 144 arranged at a radially outer edge of the radial portion 142 of the locking element. The tongues 144 are so formed that they at least partially axially outwardly extend around the outer bearing race 132 axially outwardly and extend through a work access opening 102 of the machine element 105.

In an end region, the tongues 144 have a radially inwardly open groove 146 in which a securing element in the form of a snap ring 150 can engage. The snap ring 150 is supported on a surface of the machine element 105 on a side of the machine element 105 opposite the radial portion of the locking element 142 in order to cooperate with the locking element 140 through the work access opening 102 of the machine element 105 via the plurality of tongues 144 such that the outer bearing race 132 is secured on the first axial side.

The securing element, which is formed as a snap ring 150, operatively engages with radially inwardly open grooves 146 and the machine element 105 in such a way that the locking element 140 secures the outer bearing race 132 at the first axial side.

The outer bearing race 132 is secured at an end face of a second axial side of the outer bearing race 132 by an abutment surface 109 of the machine element 105 in a second axial direction of the outer bearing race 132.

FIGS. 2A to 2I show a mounted bearing arrangement 200 and parts of the mounted bearing arrangement 200 with axial portions of the locking element which are formed as stay bolts and have annular securing means with bayonet-type operative connection.

The bearing arrangement 200 for a machine element 105 has a bearing 130 which is formed as a grooved ball bearing and which has an outer bearing race 132 and rolling elements 133 arranged between the inner bearing race 134 and the outer bearing race 132. The bearing 130 is arranged in a cylindrical cutout 101 of the machine element 105 and is accordingly radially fixed.

The machine element 105 itself can have a first machine part 106 and a second machine part 107. In the present embodiment example, the first machine part 106 can be formed as input shaft and the second machine part 107 can be formed as plate carrier. The first machine part 106 and the second machine part 107 can be connected to one another by rivets or welds.

The annular radial portion of the locking element 242 has an opening arranged on an outer step 136 of the outer bearing race 132 in order to cooperate with an end face 135 of a circumferential shoulder of the outer bearing race 132 in an end region in that it adjoins an end face 135 of the shoulder at least by part of the annular radial portion 242 of the locking element 240 in order to secure the outer bearing race 132 at the first axial side.

The locking element 240 has an annular radial portion 242 and a plurality of axial portions formed by a stay bolt 244 which is arranged and connected with the annular radial portion 242 of the locking element 240 at a radially outer edge of the radial portion 242 of the locking element 240. The radially outer edge of the radial portion 242 of the locking element 240 extends radially outward to the extent that the stay bolts 244 at least partially axially outwardly extend around the outer bearing race 132 with the radial portion 242 of the locking element 240.

In an end region, the stay bolts 244 have at least one groove 246 at their circumference. In the mounted state of the bearing arrangement 200, each stay bolt 244 of the plurality of stay bolts 244 extends through a work access opening 102 of the machine element 105 on a side of the machine element 105 opposite the radial portion 242 of the locking element 240 so as to cooperate with the securing element 200.

The securing element 250 is formed annularly and has recesses 252, each of which is adapted to form a bayonet-type working connection with the at least one groove 246 of the stay bolt 244. This annular securing element 250 having bayonet-type recesses 252 for the grooves 246 of the stay bolts 244 is supported on a surface of the machine element 105 on a side of the machine element 105 opposite the radial portion 242 of the locking element 240 in order to cooperate with the locking element 240 through the work access opening 102 of the machine element 105 via the stay bolts 244 such that the outer bearing race 132 is secured at the first axial side.

The outer bearing race 132 is secured at an end face of a second axial side of the outer bearing race 132 by an abutment surface 109 of the machine element 105 in direction of the second axial side of the outer bearing race 132.

Figure 3:
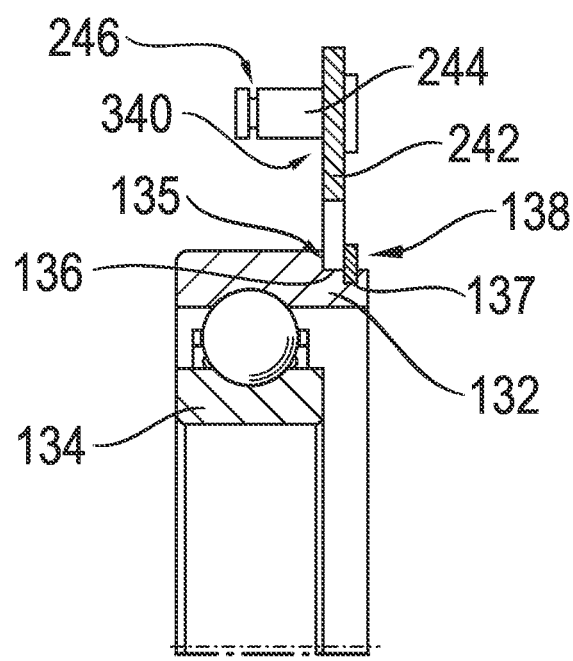
FIG. 3 is a bearing with locking element and retaining ring on the bearing.

FIG. 3 illustrates how the locking element 340 cooperates, in accordance with an aspect, with the outer bearing race 132 in that the locking element 340 adjoins an axial end face 135 of a circumferential shoulder in an end region of the outer bearing race 132 in order to secure the outer bearing race 132 on the first axial side.

To this end, the outer bearing race 132 has a step 136 at its radially outer circumference to form the shoulder. The locking element 340 has a correspondingly large through-going bore hole so that the locking element 340 can be slid onto the outer bearing race 132 up to the end face 135 of the shoulder in the region of the step 136. The locking element 340 is secured at the shoulder of the outer bearing race 132 by means of a retaining ring 138 which is inserted in a correspondingly arranged circumferential groove 137 in the area of the step 136 of the outer bearing race 132 such that the locking element 340 is secured in the axial direction opposite to the end face 135 of the shoulder.

Figure 4:
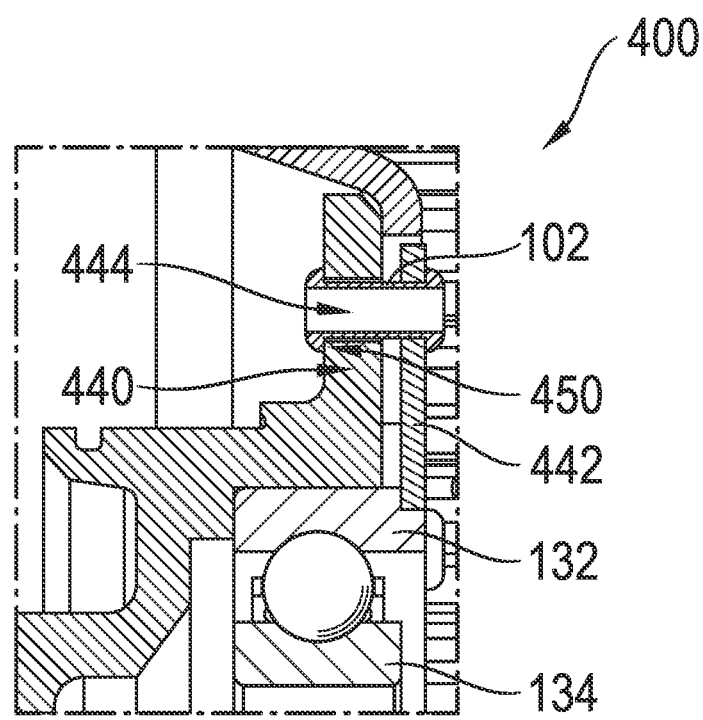
FIG. 4 is a bearing arrangement with a hollow rivet as axial portion of the locking element.

FIG. 4 shows a bearing arrangement 400 in which the at least one axial portion 444 of the locking element 440 is formed by a hollow rivet which is connected to the annular radial portion 442 of the locking element 400. The hollow rivet extends in the mounted state of the bearing arrangement 400 through the at least one work access opening 102 of the machine element 105 on a side of the machine element 105 opposite the radial portion 442 of the locking element 440. The securing element 450 in the form of a rivet collar of the hollow rivet is formed on a surface of a side of the machine element 105 opposite the radial portion 442 of the locking element 440.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A bearing arrangement for a machine element, comprising:
    a bearing having an outer bearing race which is radially fixed by a cylindrical cutout of the machine element in a mounted state of the bearing arrangement;
    at least one locking element comprising:
        an annular radial portion is arranged and configured to cooperate with a region of the outer bearing race on a first axial side of the outer bearing race to secure the outer bearing race at the first axial side; and
        at least one axial portion; and
    at least one securing element which, in a mounted state of the bearing arrangement, is in operative engagement with the at least one axial portion of the at least one locking element and with the machine element such that the at least one locking element secures the outer bearing race at the first axial side,
wherein the at least one axial portion of the at least one locking element is arranged in a radially outer region of the radial portion of the at least one locking element and at least partially axially outwardly extends around the outer bearing race and, in the mounted state of the bearing arrangement, to secure the outer bearing race at the first axial side by the at least one locking element, cooperates through at least one work access opening of the machine element with the securing element which is supported on a side of the machine element opposite the radial portion of the at least one locking element,
    wherein the at least one axial portion of the at least one locking element is formed by a tongue arranged at a radially outer edge of the radial portion of the at least one locking element, and
    wherein the tongue has a radially inwardly open groove in an end region, and the securing element is a snap ring which engages in the radially inwardly open groove of the tongue on the side of the machine element opposite the radial portion of the at least one locking element.

2. The bearing arrangement according to claim 1, wherein the outer bearing race is secured at an end face of a second axial side of the outer bearing race by an abutment surface of the machine element in a second axial direction of the outer bearing race.

3. The bearing arrangement according to claim 1, wherein the at least one locking element adjoins an end face of the first axial side of the outer bearing race at least by part of the annular radial portion to secure the outer bearing race at an axial side.

4. The bearing arrangement according to claim 1, wherein the outer bearing race has a circumferential shoulder in an end region at the first axial side, and at least part of the annular radial portion of the at least one locking element adjoins an end face of the shoulder to secure the outer bearing race on an axial side.

5. The bearing arrangement according to claim 1, wherein the tongue extends through the at least one work access opening of the machine element, and the securing element is an adjusted end portion of the tongue supported on the side of the machine element opposite the radial portion of the at least one locking element.

6. The bearing arrangement according to claim 1, wherein the at least one axial portion of the at least one locking element is formed by a stay bolt which is connected to the annular radial portion of the at least one locking element, and wherein the stay bolt has at least one groove in an end region at its circumference and, in the mounted state of the bearing arrangement, the stay bolt extends through the work access opening of the machine element on a side of the machine element opposite the radial portion of the at least one locking element; and the securing element is formed annularly and has recesses which are configured to form a bayonet-type operative connection with the at least one groove of the stay bolt.

7. The bearing arrangement according to claim 1, wherein the at least one locking element has a plurality of axial portions on a circumference of the annular radial portion or tongues of the at least one locking element which are uniformly distributed on the circumference.

8. The bearing arrangement according to claim 1, wherein the bearing arrangement is configured to mount an input shaft on an output hub.

9. A bearing arrangement for a machine element, comprising:
    a bearing having an outer bearing race which is radially fixed by a cylindrical cutout of the machine element in a mounted state of the bearing arrangement;
    at least one locking element comprising:
        an annular radial portion is arranged and configured to cooperate with a region of the outer bearing race on a first axial side of the outer bearing race to secure the outer bearing race at the first axial side; and
        at least one axial portion; and
    at least one securing element which, in a mounted state of the bearing arrangement, is in operative engagement with the at least one axial portion of the at least one locking element and with the machine element such that the at least one locking element secures the outer bearing race at the first axial side, wherein
    the at least one axial portion of the at least one locking element is arranged in a radially outer region of the radial portion of the at least one locking element and at least partially axially outwardly extends around the outer bearing race and, in the mounted state of the bearing arrangement, to secure the outer bearing race at the first axial side by the at least one locking element, cooperates through at least one work access opening of the machine element with the securing element which is supported on a side of the machine element opposite the radial portion of the at least one locking element, wherein the at least one axial portion of the at least one locking element is formed by a stay bolt connected to the annular radial portion or tongues of the at least one locking element, and the stay bolt has a thread, and the securing element is a screw that cooperates with the thread and is supported on the side of the machine element opposite the radial portion of the at least one locking element.

10. The bearing arrangement according to claim 9, wherein the stay bolt is a hollow rivet with thread which is connected to the at least one locking element.

11. A bearing arrangement for a machine element, comprising:
- a bearing having an outer bearing race which is radially fixed by a cylindrical cutout of the machine element in a mounted state of the bearing arrangement;
- at least one locking element comprising:
  - an annular radial portion is arranged and configured to cooperate with a region of the outer bearing race on a first axial side of the outer bearing race to secure the outer bearing race at the first axial side; and
  - at least one axial portion; and
- at least one securing element which, in a mounted state of the bearing arrangement, is in operative engagement with the at least one axial portion of the at least one locking element and with the machine element such that the at least one locking element secures the outer bearing race at the first axial side, wherein
- the at least one axial portion of the at least one locking element is arranged in a radially outer region of the radial portion of the at least one locking element and at least partially axially outwardly extends around the outer bearing race and, in the mounted state of the bearing arrangement, to secure the outer bearing race at the first axial side by the at least one locking element, cooperates through at least one work access opening of the machine element with the securing element which is supported on a side of the machine element opposite the radial portion of the at least one locking element,
- wherein the at least one axial portion of the at least one locking element is formed by a screw which is connected to the annular radial portion of the at least one locking element by a thread in the at least one locking element; and the securing element is a head of the screw, and the screw cooperates with the thread and is supported on the side of the machine element opposite the radial portion of the at least one locking element.

12. A The bearing arrangement for a machine element, comprising:
- a bearing having an outer bearing race which is radially fixed by a cylindrical cutout of the machine element in a mounted state of the bearing arrangement;
- at least one locking element comprising:
  - an annular radial portion is arranged and configured to cooperate with a region of the outer bearing race on a first axial side of the outer bearing race to secure the outer bearing race at the first axial side; and
  - at least one axial portion; and
- at least one securing element which, in a mounted state of the bearing arrangement, is in operative engagement with the at least one axial portion of the at least one locking element and with the machine element such that the at least one locking element secures the outer bearing race at the first axial side, wherein
- the at least one axial portion of the at least one locking element is arranged in a radially outer region of the radial portion of the at least one locking element and at least partially axially outwardly extends around the outer bearing race and, in the mounted state of the bearing arrangement, to secure the outer bearing race at the first axial side by the at least one locking element, cooperates through at least one work access opening of the machine element with the securing element which is supported on a side of the machine element opposite the radial portion of the at least one locking element,
- wherein the at least one axial portion of the at least one locking element is formed by a hollow rivet connected to the annular radial portion of the at least one locking element, and wherein, in the mounted state of the bearing arrangement, the hollow rivet extends through the at least one work access opening of the machine element on a side of the machine element opposite the radial portion of the at least one locking element; and the securing element is a rivet collar of the hollow rivet.

* * * * *